E. P. HERPIN.
CARBURETING BURNER.
APPLICATION FILED MAY 8, 1920.
1,403,954.
Patented Jan. 17, 1922.
2 SHEETS—SHEET 1.
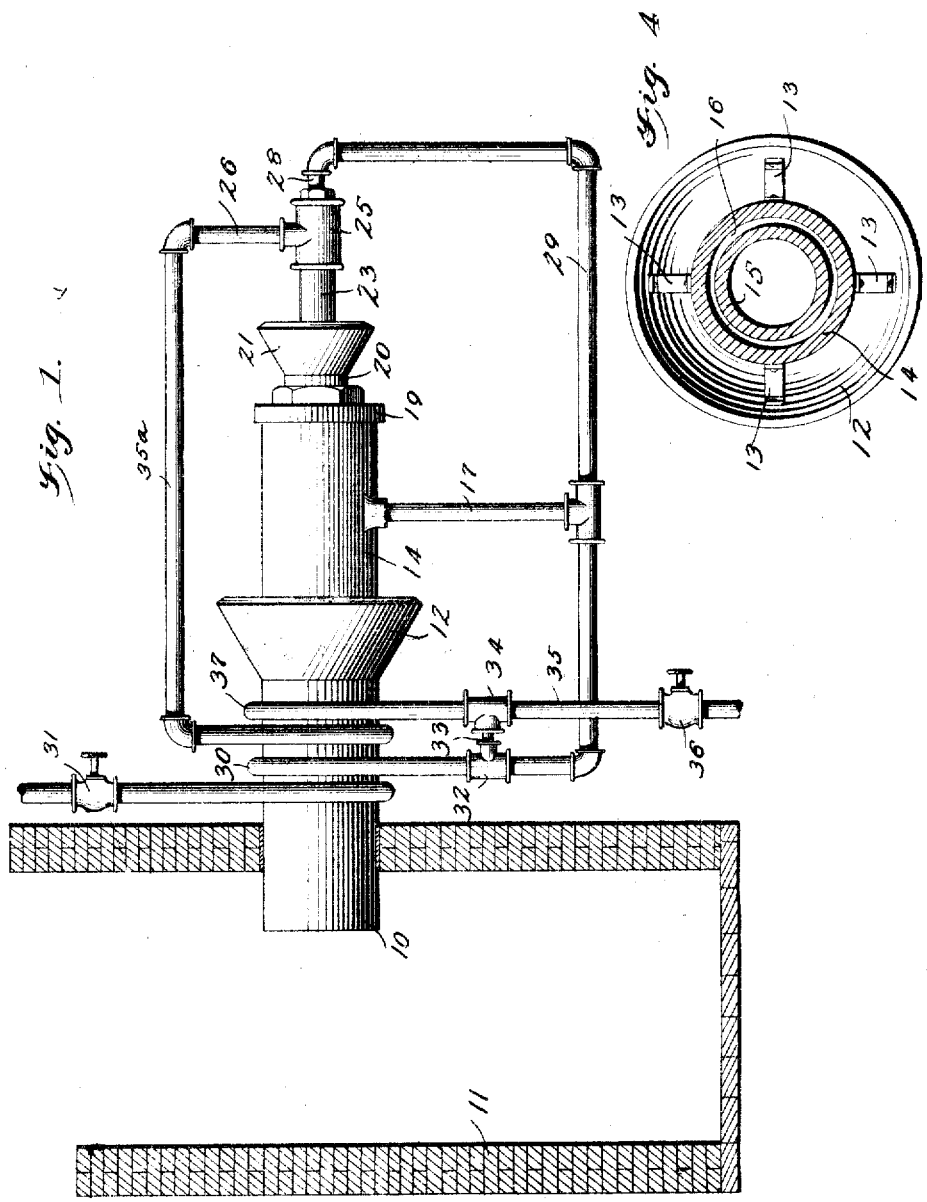
WITNESSES
INVENTOR
E. P. Herpin,
BY
ATTORNEYS

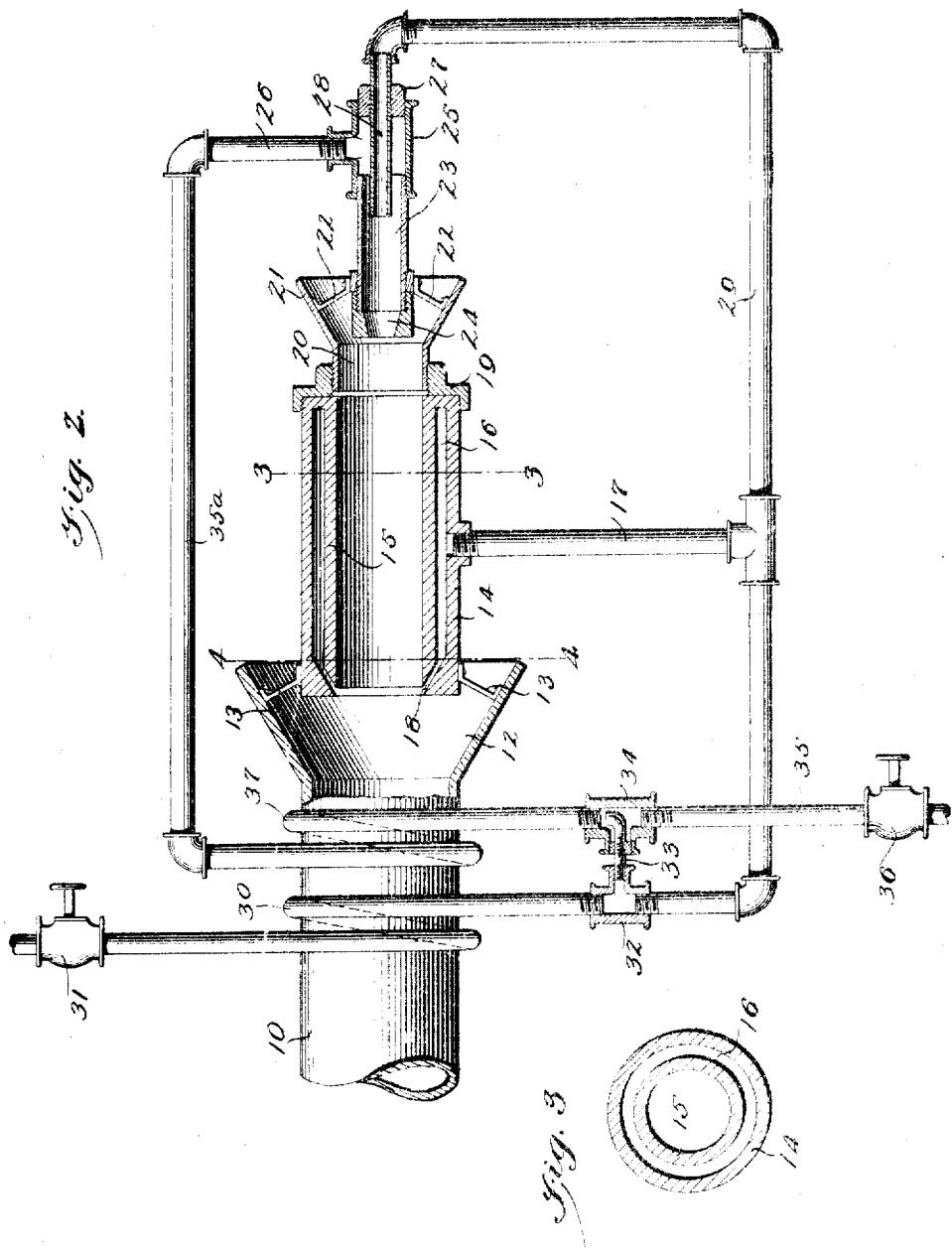

UNITED STATES PATENT OFFICE.

EDWARD PETER HERPIN, OF DE QUINCY, LOUISIANA, ASSIGNOR OF ONE-HALF TO APOLENAIRE OZIAS BORDELON, OF BAY SAINT LOUIS, MISSISSIPPI.

CARBURETING BURNER.

1,403,954. Specification of Letters Patent. Patented Jan. 17, 1922.

Application filed May 8, 1920. Serial No. 379,826.

*To all whom it may concern:*

Be it known that I, EDWARD PETER HERPIN, a citizen of the United States, and a resident of De Quincy, in the parish of Calcasieu and State of Louisiana, have invented certain new and useful Improvements in Carbureting Burners, of which the following is a specification.

My present invention relates generally to hydrocarbon burners and more particularly to a carbureting burner, my object being the provision of a burner including as a part thereof a combustion chamber and means for thoroughly carbureting the fuel and especially one in which provision is made for the primary combustion of the fuel, secondary combustion of which takes place in the space to be heated, with which the burner is connected.

In the accompanying drawings which illustrate my present invention and form a part of this specification, Figure 1 is a sectional side view illustrating the practical application of my invention, Figure 2 is an enlarged side view, partly broken away and in section, and Figures 3 and 4 are detail transverse sections taken respectively on lines 3—3 and 4—4 of Figure 2.

Referring now to these figures and particularly to Figures 1 and 2 my invention proposes a burner including a cylindrical combustion tube 10, one end of which may be extended into communicating relation with the interior of a furnace or other space as indicated at 11 in Figure 1 where the heat of combustion is utilized and wherein the secondary combustion takes place.

The opposite end of the combustion tube 10 is flared as indicated at 12 and within this flared end 12 an annular series of supporting brackets 13 support one end of the outer cylindrical shell 14 of the body of the burner, whose inner shell 15 forms a mixing chamber therein and is spaced from the outer shell to form an annular chamber 16 therebetween with which one end of a pipe 17 communicates. This space 16 is in communication at one end with a tapering channel 18 opening into the flared end 12 of the combustion tube around the outlet end of the inner shell 15.

At the opposite end of the body of the burner including the inner and outer shells just above described, is a threaded supporting cap 19 holding a short tube 20 having a flared free end 21 within which brackets 22 support one end of an atomizing tube 23 having a tapering nozzle 24 secured to its said end within the flared extension 21 of the body. The atomizing tube 23 is threaded at its opposite end into a T-coupling 25 within the angular leg of which one end of an oil pipe 26 is connected, and into which, opposite the tube 23, is a plug 27 through which the nozzle 28 extends into the atomizing tube in spaced coaxial relation.

An air or steam pipe 29 is connected to the nozzle 28 and also communicates with the pipe 17, and this pipe 29 leads from a coil 30 surrounding the combustion tube 10 and leading from a suitable supply, with a controlling valve 31 arranged therein. Adjacent to the coil 30, pipe 29 has a T-coupling 32 from which a nipple 33 extends laterally and enters the angular channel of a T-coupling 34 of an oil supply pipe 35, leading from any suitable source and provided with a controlling valve 36.

The nipple 33 is turned at its free end in the pipe 35 in a direction away from the source of oil and toward a coil 37 around the combustion tube 10, from which a section 35ª of the oil pipe extends to the T-connection 25 of the atomizing tube previously described.

It is thus evident that when the steam or air under pressure is turned on by opening the valve 31, it passes through the coil 30 and through the nipple 33, as well as through the pipe 29, part of the steam or air finding its way through the pipe 17 to the chamber 16 between the inner and outer shells of the burner body, and part thereof passing to the atomizing tube 23. When the oil is turned on by opening the valve 36, the steam or air passing through the nipple 33 strikes the oil and thus the latter will be blown or atomized through the coil 37 and through the section 35ª of the oil pipe into the T-coupling 25. Thus the oil finds its way into the atomizing tube 23 along with the air or steam through the nozzle 28, and is again atomized in its passage through the reduced discharge nozzle 24 of the atomizing tube into the burner body where it combines with air drawn through the flared end 21 of the body around the nozzle 24 by suction from the nozzle 18 of the air or steam space 16. When the mixture is thus carbureted and reaches the nozzle 18 it is driven into the combustion tube 10 along with more air drawn into the combustion tube through its flared end around the adjacent end of the burner body, and in the combustion tube it is ignited for passage therefrom to the furnace, fire box or other space where the products of combustion are utilized.

This combustion heats the tube 10 which in turn imparts some of its heat to the coils 30 and 37 so that the oil will be blown through the pipe section 35ª in a heated state and the air passing through the coil 30 will be heated or the steam, if such is utilized, superheated in order to take out all moisture. Thus in the event the oil has some moisture in it, the moisture will be converted and the efficiency of the apparatus as a whole materially increased in this way.

As distinguished from the usual atomizer for injecting fuel into a combustion chamber for primary combustion in the latter, it is thus to be seen my invention proposes a carbureting burner having a combustion space in which primary combustion takes place, the heat of which is utilized in very thorough carburation as previously described, leaving the secondary combustion to take place in the furnace, fire box or other space to be heated.

I claim:

1. A carbureting burner including a combustion tube having a flared receiving end, a body consisting of inner and outer shells and opening into the flared end of the combustion tube in spaced relation, said space between the inner and outer shells terminating in a nozzle at the discharge end of the body, a flared extension carried by the opposite end of the body, an atomizing tube having a nozzle opening at one end into the flared end of the body in spaced relation thereto, and having its opposite end closed, a nozzle extending into the last mentioned end of the atomizing tube, and opening into said tube, a fluid pipe communicating with the last mentioned nozzle, a second fluid pipe communicating with the atomizing tube around the last mentioned nozzle, and a pipe leading from the first mentioned fluid pipe and communicating with the space between the shells of the body.

2. A carbureting burner including a combustion tube having a flared receiving end, a body consisting of inner and outer shells and opening into the flared end of the combustion tube in spaced relation, said space between the inner and outer shells terminating in a nozzle at the discharge end of the body, a flared extension carried by the opposite end of the body, an atomizing tube having a nozzle opening at one end into the flared end of the body in spaced relation thereto, and having its opposite end closed, a nozzle extending into the last mentioned end of the atomizing tube, and opening into said tube, a fluid supply pipe communicating with the last mentioned nozzle, a second fluid supply pipe communicating with the atomizing tube around the last mentioned nozzle, and a branch supply pipe leading from the first mentioned fluid pipe into the space between the shells of the body, said fluid pipes having coils around the combustion tube as described.

3. A carbureting burner including a combustion tube having a flared receiving end, a body consisting of inner and outer shells and opening into the flared end of the combustion tube in spaced relation, said space between the inner and outer shells terminating in a nozzle at the discharge end of the body, a flared extension carried by the opposite end of the body, an atomizing tube having a nozzle opening into the flared end of the body in spaced relation thereto, a nozzle extending into the opposite end of the atomizing tube, a fluid supply pipe having a coil around the combustion tube and having branches beyond the coil leading to the last mentioned nozzle and to the space between the shells of the body, a second fluid supply pipe having a coil around the combustion tube and leading to the atomizing tube adjacent to the last mentioned nozzle, and a nipple extending from the first fluid pipe and opening into the last mentioned fluid pipe in the direction of flow of fluid in the latter.

4. A carbureting burner including a combustion tube having a flared receiving end, a body consisting of inner and outer shells and opening into the flared end of the combustion tube in spaced relation, said space between the inner and outer shells terminating in a nozzle at the discharge end of the body, a flared extension carried by the opposite end of the body, an atomizing tube having a nozzle opening into the flared end of the body in spaced relation thereto, a nozzle extending into the opposite end of the atomizing tube, a fluid supply pipe having a coil around the combustion tube and having branches beyond the coil leading to the last mentioned nozzle and to the space between the shells of the body, a second fluid supply pipe having a coil around the combustion tube and leading to the atomizing tube adjacent to the last mentioned nozzle, and a nipple extending from the first fluid pipe between its coil and its said branches and leading to the last mentioned fluid pipe at the intake side of the coil of the latter and opening therein in the direction of flow of fluid thereof.

EDWARD PETER HERPIN.